(12) United States Patent
Lincoln et al.

(10) Patent No.: US 12,196,658 B2
(45) Date of Patent: Jan. 14, 2025

(54) OPTICAL PARTICULATE DETECTION FOR AN AIRCRAFT

(71) Applicant: RTX Corporation, Farmington, CT (US)

(72) Inventors: David L. Lincoln, Cromwell, CT (US); Xuemei Wang, South Windsor, CT (US); Alek Gavrilovski, West Hartford, CT (US); Michael T. Gorski, Clinton, CT (US)

(73) Assignee: RTX CORPORATION, Farmington, CT (US)

( * ) Notice: Subject to any disclaimer, the term of this patent is extended or adjusted under 35 U.S.C. 154(b) by 316 days.

(21) Appl. No.: 17/529,411

(22) Filed: Nov. 18, 2021

(65) Prior Publication Data

US 2022/0170837 A1 Jun. 2, 2022

Related U.S. Application Data

(60) Provisional application No. 63/119,749, filed on Dec. 1, 2020.

(51) Int. Cl.
| | | |
|---|---|---|
| G01N 15/0205 | (2024.01) | |
| G01M 15/14 | (2006.01) | |
| G01N 15/00 | (2024.01) | |

(52) U.S. Cl.
CPC ......... *G01N 15/0211* (2013.01); *G01M 15/14* (2013.01); *G01N 2015/0046* (2013.01)

(58) Field of Classification Search
CPC ............... G01N 15/0211; G01N 2015/0046
See application file for complete search history.

(56) References Cited

U.S. PATENT DOCUMENTS

| | | | | |
|---|---|---|---|---|
| 5,164,604 | A * | 11/1992 | Blair ................... | G08B 17/113 |
| | | | | 340/630 |
| 5,296,910 | A * | 3/1994 | Cole .................. | G01N 15/0205 |
| | | | | 356/336 |
| 7,471,393 | B2 * | 12/2008 | Trainer .............. | G01N 15/1459 |
| | | | | 356/336 |
| 8,256,277 | B2 | 9/2012 | Khibnik et al. | |
| 9,909,971 | B2 * | 3/2018 | Knobloch ................ | F02C 7/05 |
| 10,759,543 | B1 | 9/2020 | Haye | |
| 10,845,294 | B1 | 11/2020 | Lincoln et al. | |
| 11,237,089 | B2 * | 2/2022 | Lin ........................ | G01N 21/53 |

(Continued)

OTHER PUBLICATIONS

European Search Report for European Application 21211598.4; Date of Search: Apr. 21, 2022; 8 pages.

*Primary Examiner* — Rebecca C Bryant
(74) *Attorney, Agent, or Firm* — CANTOR COLBURN LLP

(57) ABSTRACT

An optical particulate detection system for an aircraft is provided. The optical particulate detection system includes an optical particulate detector and a controller. The optical particulate detector includes at least two optical sources and at least one optical sensor distributed in series with respect to a flow path of a component surface of the aircraft. The controller is configured to interface with the optical particulate detector, monitor the at least one optical sensor, and characterize one or more particles of foreign object debris based on a pulse width and two or more scattering ratios determined with respect to light emitted from the at least two optical sources.

18 Claims, 15 Drawing Sheets

(56) References Cited

U.S. PATENT DOCUMENTS

| | | | |
|---|---|---|---|
| 2002/0165310 A1* | 11/2002 | Zhou | C09J 7/38 |
| | | | 524/505 |
| 2010/0073173 A1 | 3/2010 | Zindy et al. | |
| 2018/0298778 A1 | 10/2018 | Dischinger et al. | |
| 2020/0264158 A1 | 8/2020 | Haye et al. | |
| 2020/0271561 A1* | 8/2020 | Lavrovsky | B01D 35/1435 |
| 2021/0318222 A1* | 10/2021 | Ye | G01N 15/0205 |

* cited by examiner

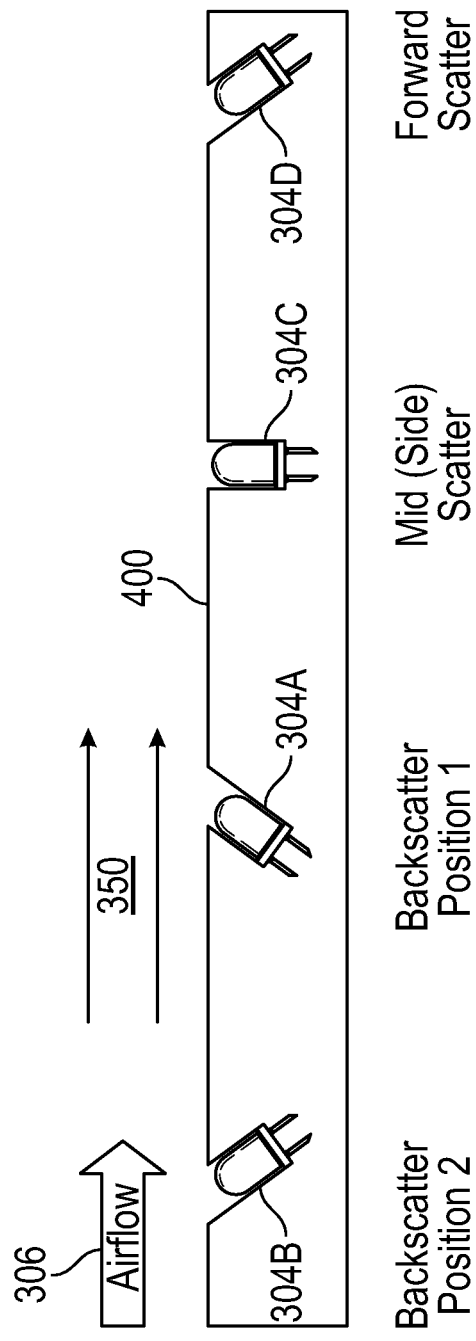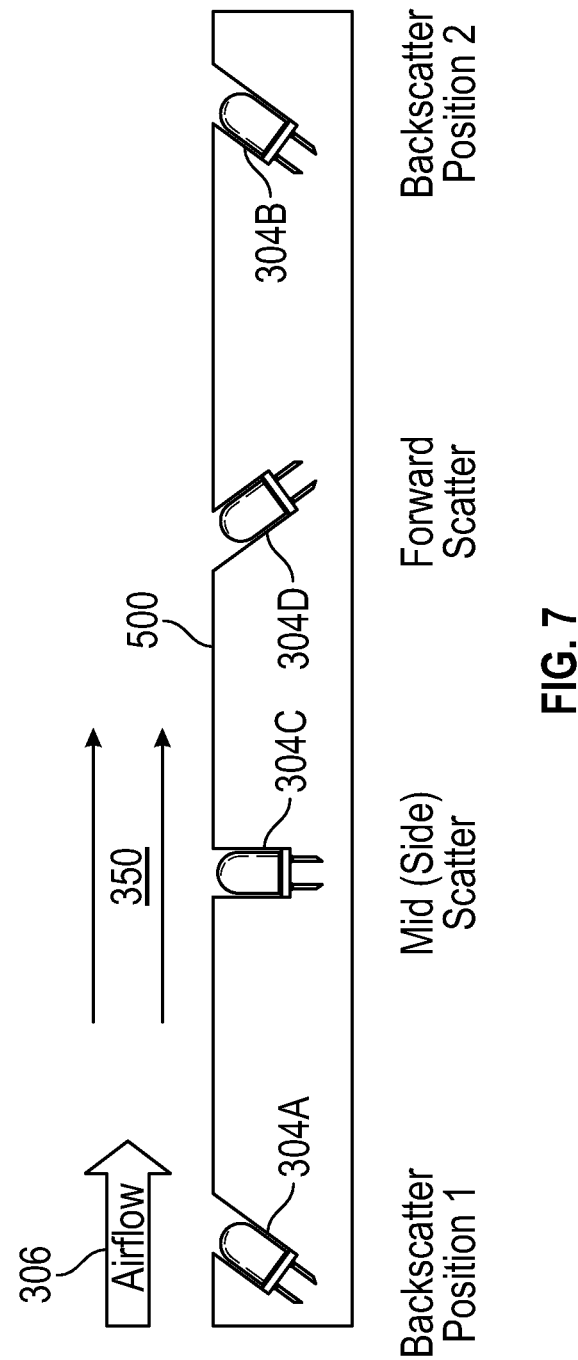

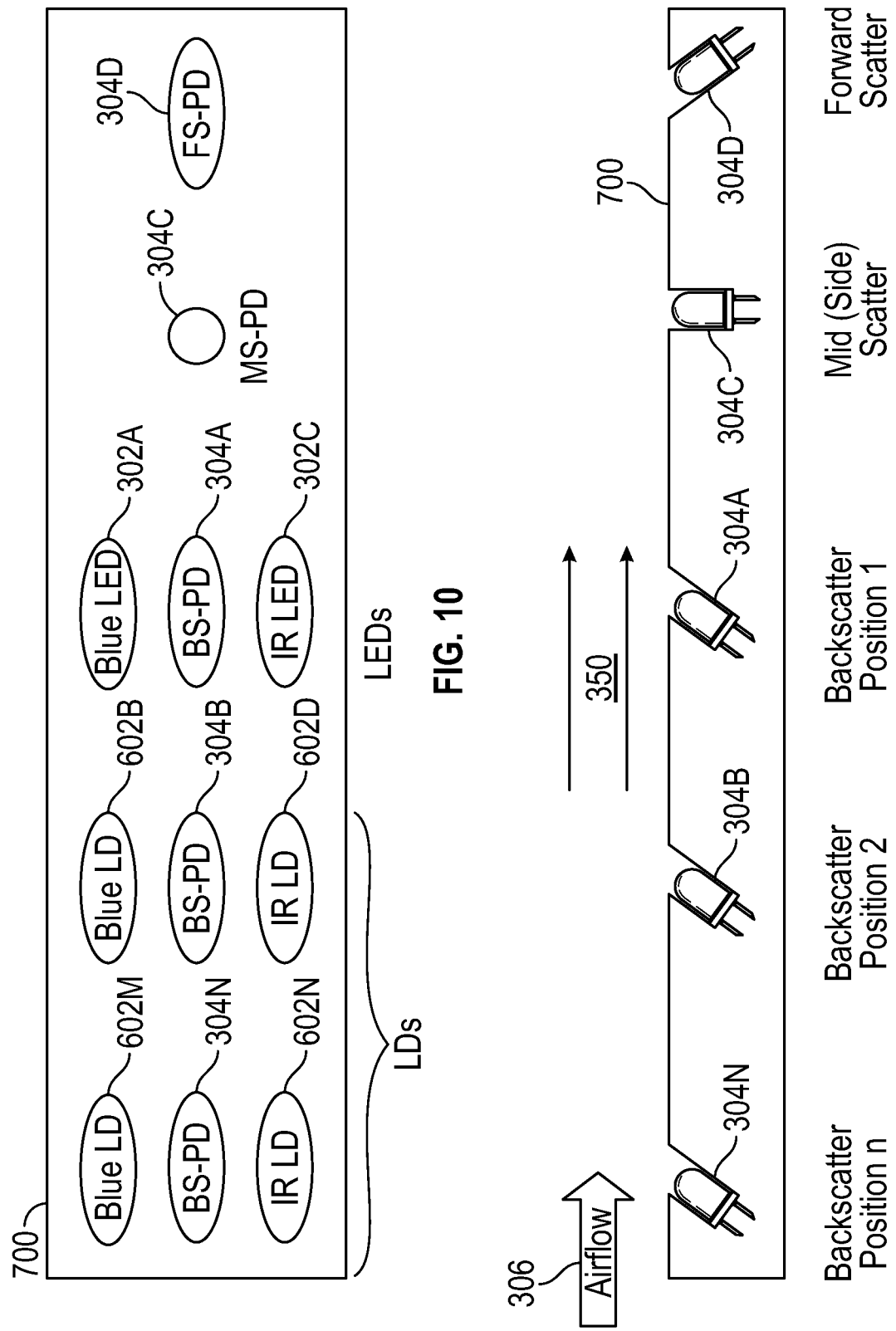

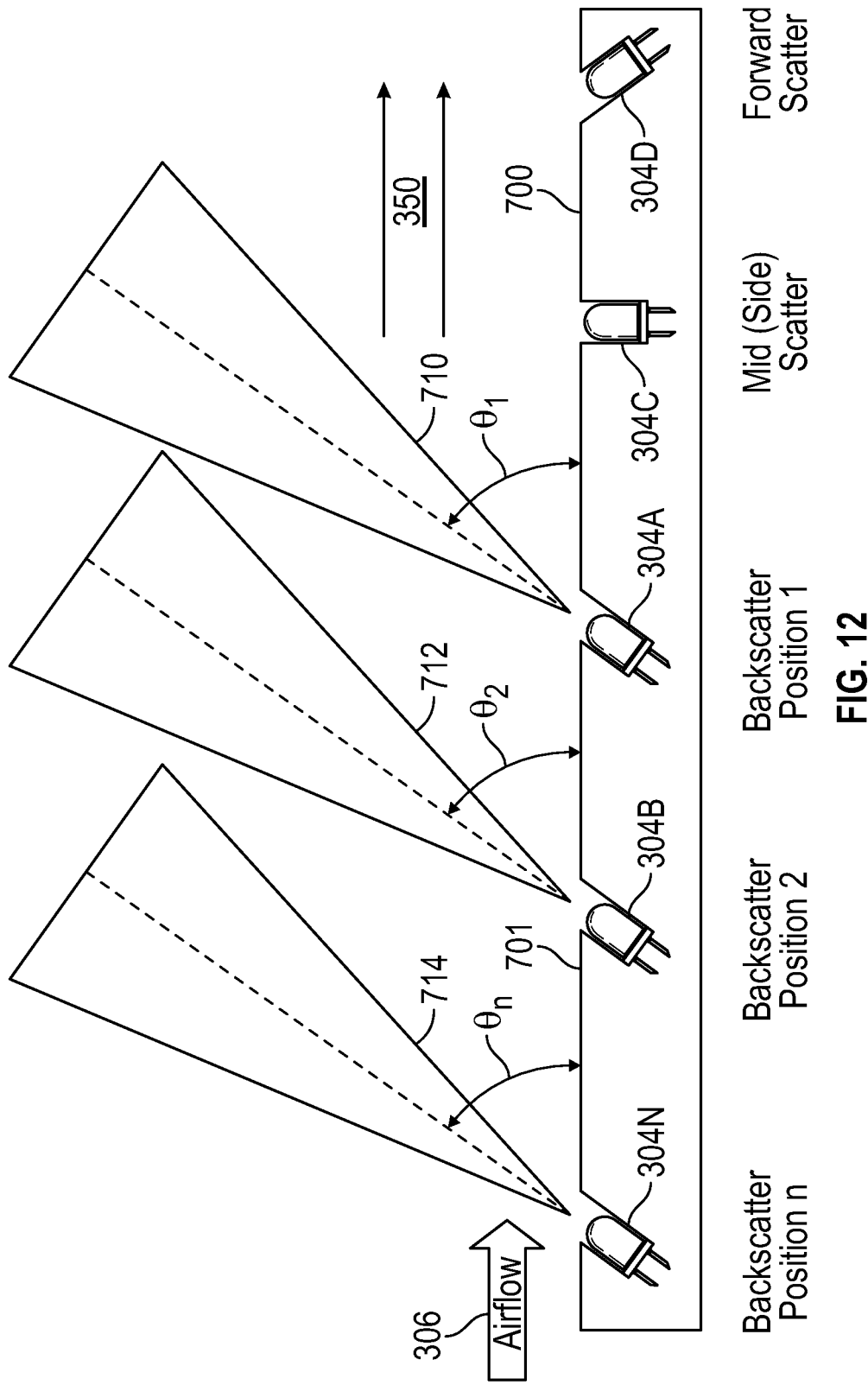

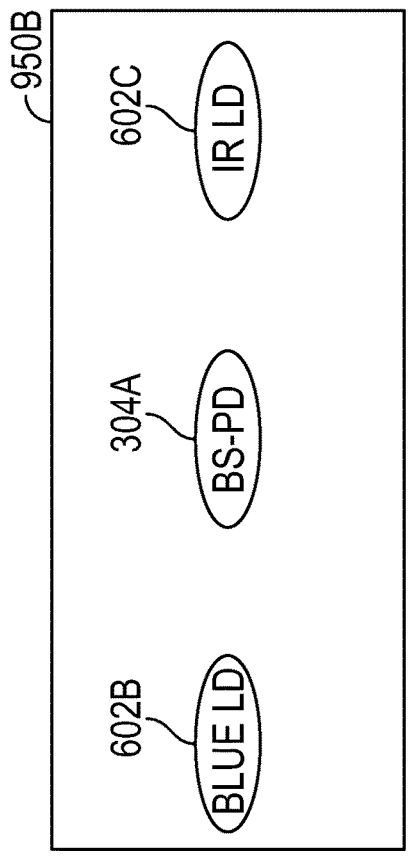
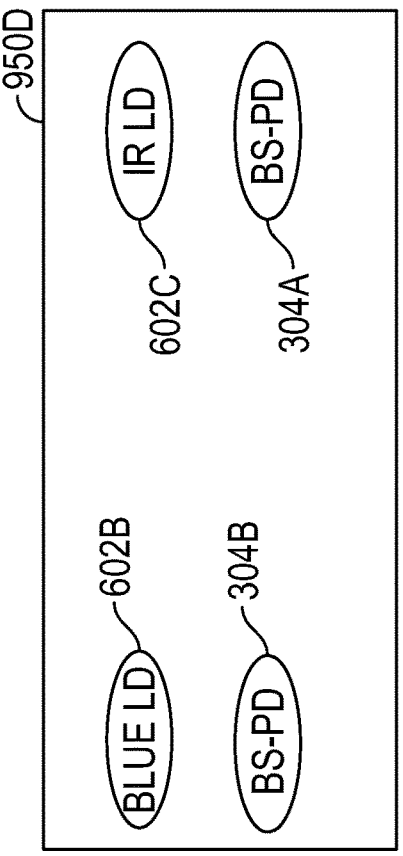
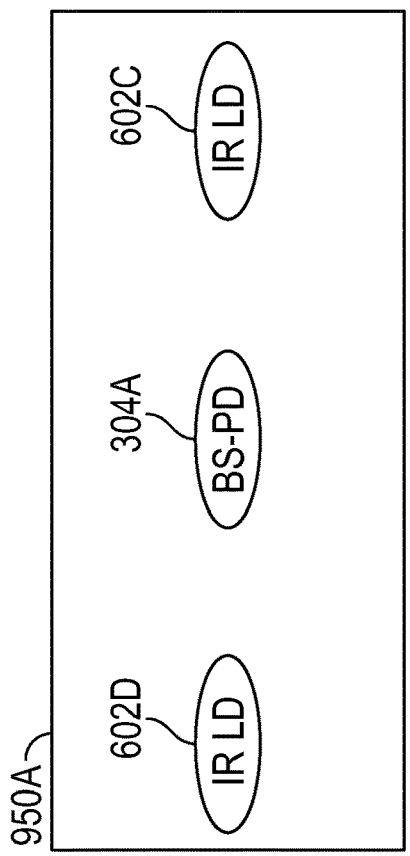
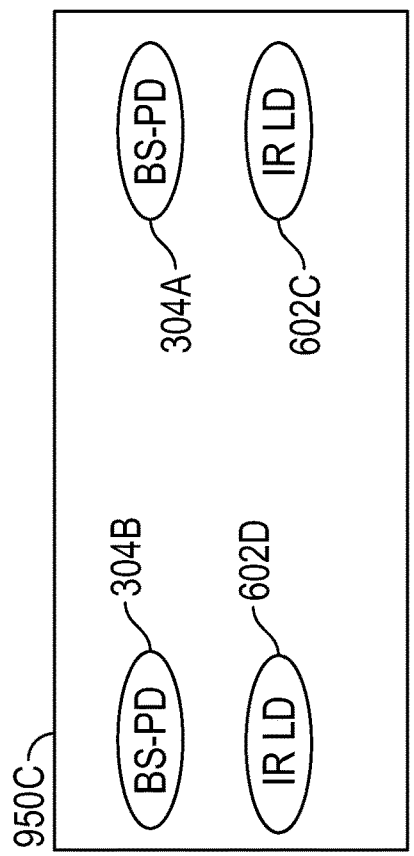
FIG. 17A
FIG. 17B
FIG. 17C
FIG. 17D

OPTICAL PARTICULATE DETECTION FOR AN AIRCRAFT

CROSS-REFERENCE TO RELATED APPLICATIONS

This application claims the benefit of U.S. Provisional Application No. 63/119,749 filed Dec. 1, 2020, the disclosure of which is incorporated herein by reference in its entirety.

BACKGROUND

The subject matter disclosed herein generally relates to aircraft systems and, more particularly, to optical particulate detection for an aircraft.

An aircraft can also include various flow paths that can receive particulate matter, referred to as foreign object debris. Flow paths can include gas turbine engines, auxiliary power units, supplemental power units, air cycle machines, air inlets, and other such pathways and surfaces. Particulate matter ingested by an aircraft component may lead to degraded performance over time based on accumulation, damage, or component wear. Accurate monitoring of detected foreign object debris can be challenging depending on the type of particulate material, particulate size, and speed of particulate movement relative to a surface or flow path of an aircraft.

BRIEF DESCRIPTION

According to one embodiment, optical particulate detection system for an aircraft is provided. The optical particulate detection system includes an optical particulate detector and a controller. The optical particulate detector includes at least two optical sources and at least one optical sensor distributed in series with respect to a flow path of a component surface of the aircraft. The controller is configured to interface with the optical particulate detector, monitor the at least one optical sensor, and characterize one or more particles of foreign object debris based on a pulse width and two or more scattering ratios determined with respect to light emitted from the at least two optical sources.

In addition to one or more of the features described above or below, or as an alternative, further embodiments may include where the controller is configured to receive a plurality of optical sensor data from the optical particulate detector, determine whether the optical sensor data exceeds a foreign object debris threshold, determine the pulse width and two or more scattering ratios based on determining that the optical sensor data exceeds the foreign object debris threshold, characterize the one or more particles of foreign object debris detected in the optical sensor data, and output a foreign object debris size and type based on characterizing the one or more particles of foreign object debris.

In addition to one or more of the features described above or below, or as an alternative, further embodiments may include where the controller is configured to determine one or more velocity measurements based on the sensor data from the at least one optical sensor, and determine a foreign object debris velocity based on the one or more velocity measurements.

In addition to one or more of the features described above or below, or as an alternative, further embodiments may include where the at least two optical sources include at least one blue light source and at least one infrared light source.

In addition to one or more of the features described above or below, or as an alternative, further embodiments may include where the at least one optical sensor comprises a plurality of sensor groups having at least two different axial angles with a plurality of sensing volumes across an area.

In addition to one or more of the features described above or below, or as an alternative, further embodiments may include where the at least one backscatter position photodetector includes a first backscatter position photodetector in series with a second backscatter position photodetector with respect to the flow path.

In addition to one or more of the features described above or below, or as an alternative, further embodiments may include where the at least two optical sources include a first pair of optical sources axially aligned with the first backscatter position photodetector and a second pair of optical sources axially aligned with the second backscatter position photodetector.

In addition to one or more of the features described above or below, or as an alternative, further embodiments may include where a first sensing angle of the first backscatter position photodetector is axially offset relative to a second sensing angle of the second backscatter position photodetector to form at least two partially overlapping sensing volumes.

In addition to one or more of the features described above or below, or as an alternative, further embodiments may include a first instance of the optical particulate detector positioned at a first location in the flow path and a second instance of the optical particulate detector positioned at a second location in the flow path.

In addition to one or more of the features described above or below, or as an alternative, further embodiments may include where the at least one optical sensor includes a first backscatter position photodetector in series with a second backscatter position photodetector and a third backscatter position photodetector with respect to the flow path.

According to an embodiment, a method includes monitoring an optical particulate detector including at least two optical sources and at least one optical sensor distributed in series with respect to a flow path of a component surface of the aircraft. The method also includes characterizing one or more particles of foreign object debris based on a pulse width and two or more scattering ratios determined with respect to light emitted from the at least two optical sources.

In addition to one or more of the features described above or below, or as an alternative, further embodiments may include receiving a plurality of optical sensor data from the optical particulate detector, determining whether the optical sensor data exceeds a foreign object debris threshold, determining the pulse width and two or more scattering ratios based on determining that the optical sensor data exceeds the foreign object debris threshold, characterizing the one or more particles of foreign object debris detected in the optical sensor data, and outputting a foreign object debris size and type based on characterizing the one or more particles of foreign object debris.

In addition to one or more of the features described above or below, or as an alternative, further embodiments may include determining one or more velocity measurements based on the sensor data from the at least one optical sensor, and determining a foreign object debris velocity based on the one or more velocity measurements.

A technical effect of the apparatus, systems and methods is achieved by detecting and characterizing foreign object debris using one or more optical particulate detectors in an aircraft system.

BRIEF DESCRIPTION OF THE DRAWINGS

The following descriptions should not be considered limiting in any way. With reference to the accompanying drawings, like elements are numbered alike:

FIG. 6 is a schematic diagram of a side view of an optical particulate detector, in accordance with an embodiment of the disclosure;

FIG. 7 is a schematic diagram of a side view of an optical particulate detector, in accordance with an embodiment of the disclosure;

FIG. 10 is a schematic diagram of a top view of an optical particulate detector, in accordance with an embodiment of the disclosure;

FIG. 11 is a schematic diagram of a side view of an optical particulate detector, in accordance with an embodiment of the disclosure;

FIG. 12 is a schematic diagram of a side view of an optical particulate detector with backscatter detection fields, in accordance with an embodiment of the disclosure;

FIG. 17A is a schematic diagram of a top view of an optical particulate detector in a first reduced optical sensor configuration, in accordance with an embodiment of the disclosure;

FIG. 17B is a schematic diagram of a top view of an optical particulate detector in a second reduced optical sensor configuration, in accordance with an embodiment of the disclosure;

FIG. 17C is a schematic diagram of a top view of an optical particulate detector in a third reduced optical sensor configuration, in accordance with an embodiment of the disclosure;

FIG. 17D is a schematic diagram of a top view of an optical particulate detector in a fourth reduced optical sensor configuration, in accordance with an embodiment of the disclosure;

DETAILED DESCRIPTION

A detailed description of one or more embodiments of the disclosed apparatus and method are presented herein by way of exemplification and not limitation with reference to the Figures.

Figure 1:
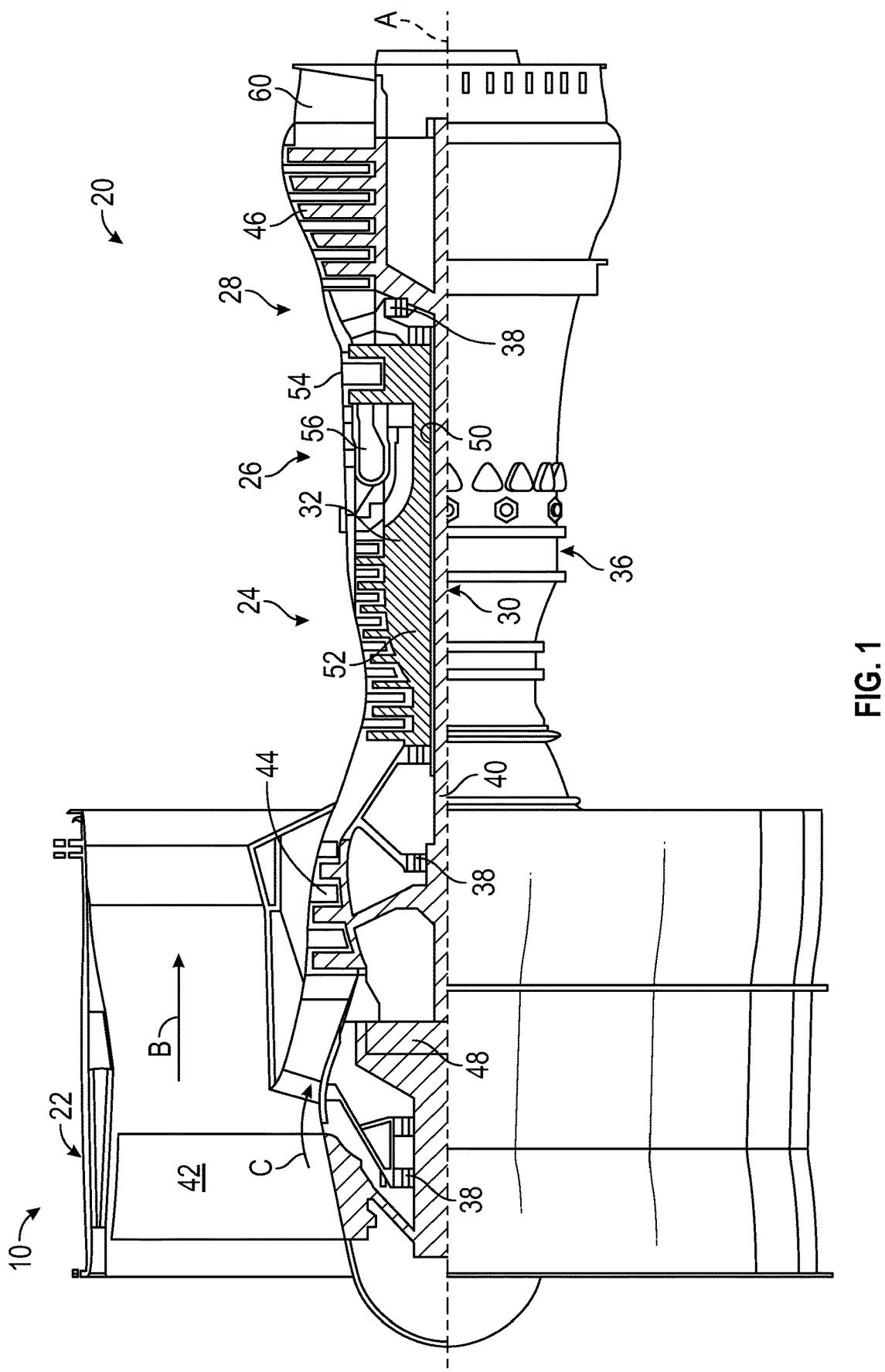
FIG. 1 is a partial cross-sectional illustration of a gas turbine engine, in accordance with an embodiment of the disclosure.

FIG. 1 schematically illustrates a gas turbine engine 20 as part of a propulsion system 10 that can include multiple instances of the gas turbine engine 20 and other components (not depicted). The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle 60. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, systems described herein can be used in a variety of applications and need not be limited to gas turbine engines for aircraft applications. The example of FIG. 1 depicts several flow paths with respect to a gas turbine engine 20 of an aircraft. Other aircraft components, such as an auxiliary power unit or supplemental power unit can have similar flow paths with respect to receiving an air flow.

Figure 2:
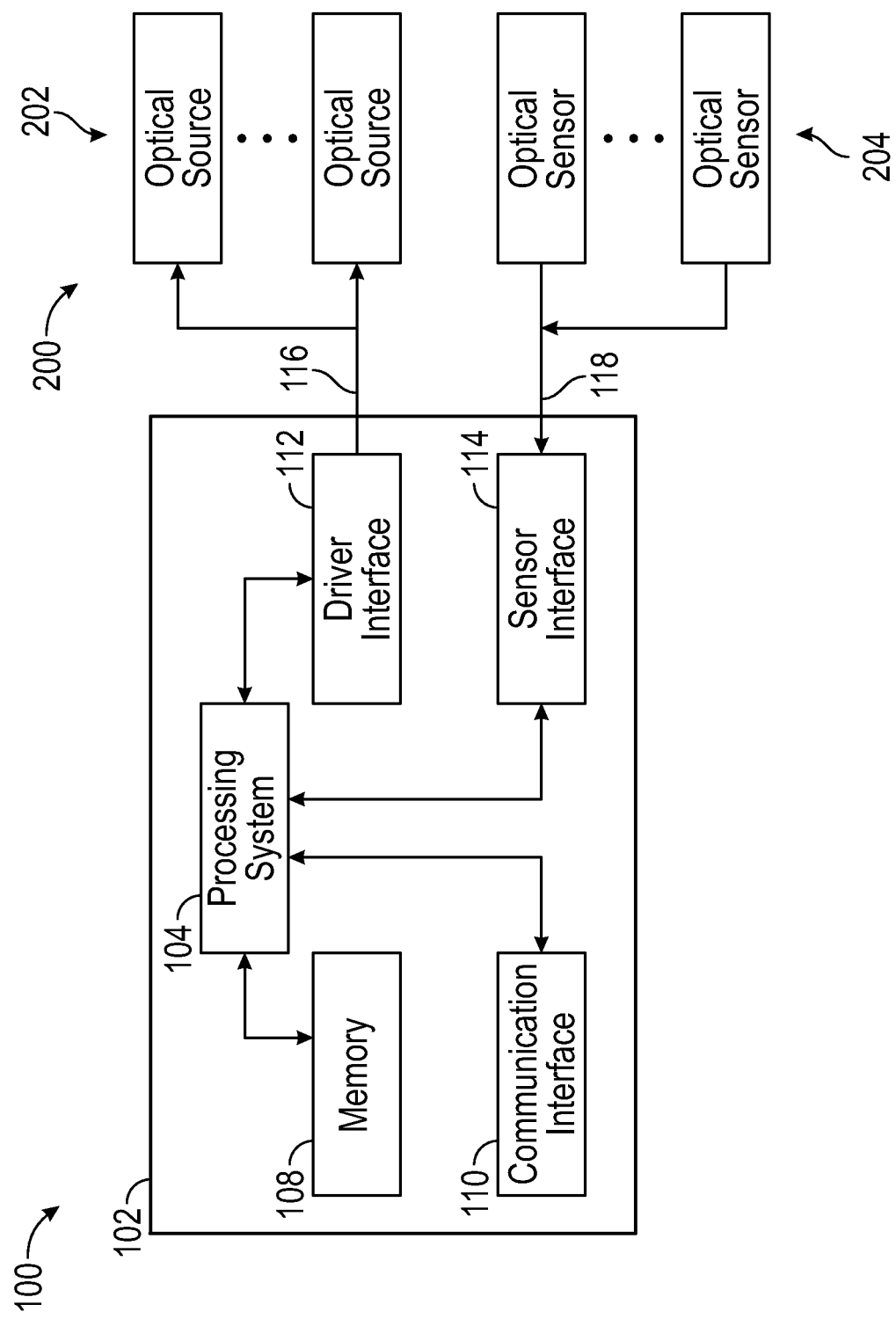
FIG. 2 is a block diagram of an optical particulate detection system, in accordance with an embodiment of the disclosure.

FIG. 2 illustrates an example of an optical particulate detection system 100 that can be part of the propulsion system 10 of FIG. 1 or incorporated elsewhere as part of an aircraft system or component. The optical particulate detection system 100 includes a controller 102 interfaced to an optical particulate detector 200. In embodiments, the controller 102 can control and monitor for fault conditions of the gas turbine engine 20 of FIG. 1. For example, the controller 102 can be integrally formed or otherwise in communication with a full authority digital engine control (FADEC) of the gas turbine engine 20. Alternatively, the controller 102 can interface with other types of aircraft components, such as controlling an auxiliary power unit, a supplemental power, unit, an air cycle machine, or other such aircraft component configured to contact or ingest an air flow from an air source external to an aircraft. Further, the controller 102 can be part of a diagnostic and/or prognostic system configured to detect and/or predict aircraft component performance issues.

In embodiments, the controller 102 can include a processing system 104, a memory system 108, a communication interface 110, a driver interface 112, and a sensor interface 114. The processing system 104 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 108 can store data and instructions that are executed by the processing system 104. In embodiments, the memory system 108 may include random access memory (RAM), read only memory (ROM), or other electronic, optical, magnetic, or any other computer readable medium onto which is stored data and algorithms in a non-transitory form. The communication interface 110 can interface with one or more other aircraft systems and/or may be configured to communicate with one or more systems external to an aircraft in which the optical particulate detection system 100 is installed. The driver interface 112 is configured to send electrical power 116 to a plurality of optical sources 202 of the optical particulate detector 200, for instance, to cause one or more of the optical sources 202 to emit light. The sensor interface 114 is configured to receive optical sensor data 118 from at least one optical sensor 204 of the optical particulate detector 200. The controller 102 provides a means for interfacing with the optical particulate detector 200 to detect and characterize the one or more particles of foreign object debris detected in the optical sensor data 118. Although the combination of multiple optical sources 202 and at least one optical sensor 204 is referred to as optical particulate detector 200, it will be understood that there can be multiple instances of the optical particulate detector 200 installed in various aircraft locations for detecting and characterizing one or more particles of foreign object debris. The controller 102 can also include and/or access various support systems, such as a global positioning system (GPS) or other such systems to monitor and tag observed particulate data with location information. The optical particulate detection system 100 can be subdivided, distributed, or combined with other control elements (not depicted).

Figure 3:
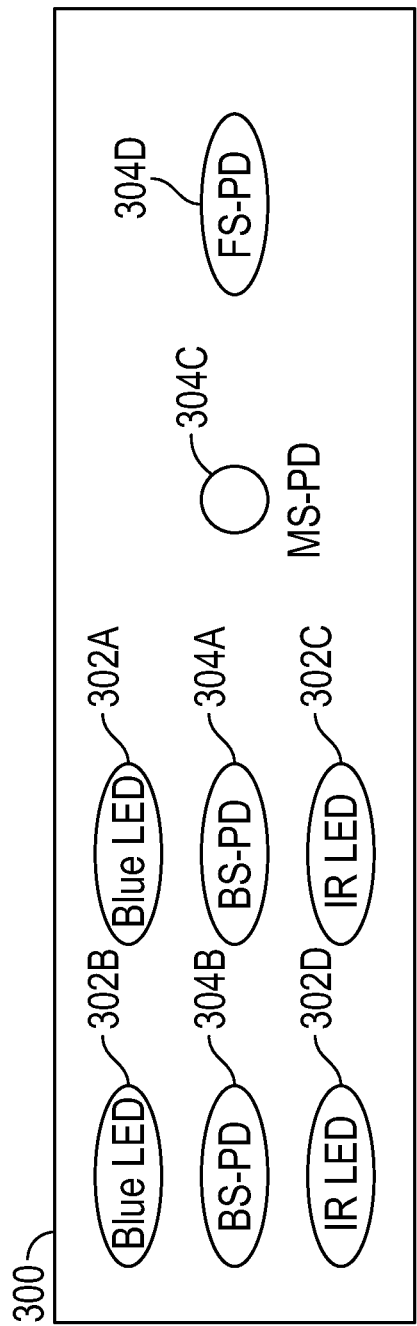
FIG. 3 is a schematic diagram of a top view of an optical particulate detector, in accordance with an embodiment of the disclosure.

FIG. 3 illustrates a schematic diagram of a top view of an optical particulate detector 300 as one example of the optical particulate detector 200 of FIG. 2. In the example of FIG. 3, the optical particulate detector 300 includes two optical sources 302A, 302B as blue light emitting diodes and two optical sources 302C, 302D as infrared light emitting diodes.

Figure 4:
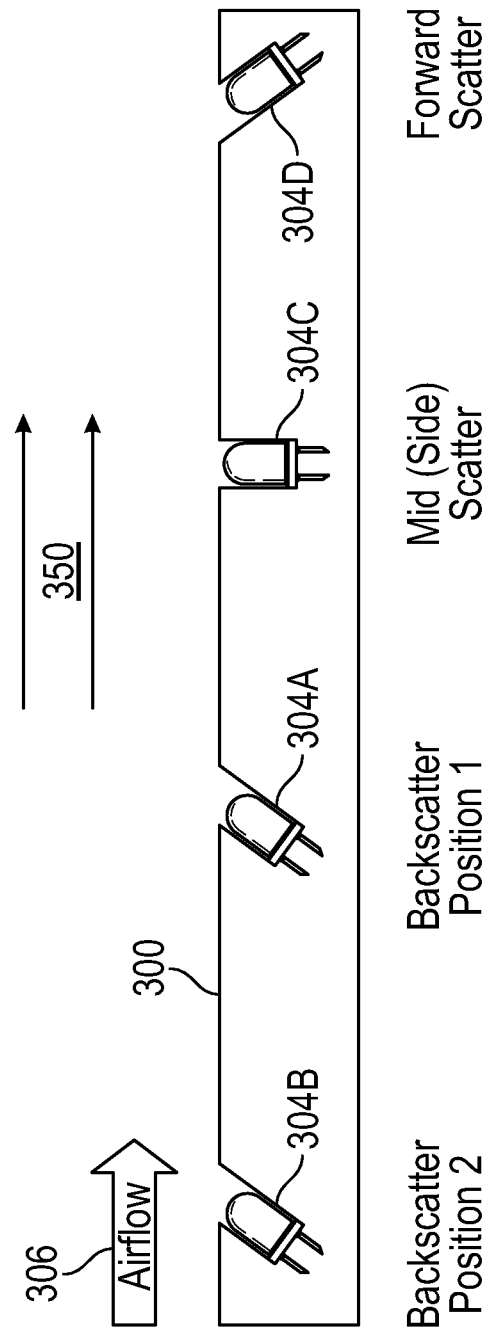
FIG. 4 is a schematic diagram of a side view of an optical particulate detector, in accordance with an embodiment of the disclosure.

The optical particulate detector 300 also includes four optical sensors 304A, 304B, 304C, 304D distributed in a series with respect to a flow path 350 of a component surface of an aircraft. For example, the particulate detector 300 can be installed in bypass flow path B or core flow path C of FIG. 1 as part of the gas turbine engine 20 of FIG. 1. The flow path 350 may be located in any portion of an aircraft exposed to an airflow 306 that may contain particulate matter as foreign object debris. Although the airflow 306 is depicted in a particular direction, the airflow 306 may be in the opposite direction and/or the orientation of the optical particulate detector 300 (or other optical particulate detector configurations further described herein) can be rotated in orientation relative to the direction of airflow 306. FIG. 4 depicts a schematic diagram of a side view of the optical particulate detector 300, indicating example positions of the optical sensors 304A, 304B, 304C, 304D along the flow path 350. In the example of FIGS. 3 and 4, optical sensor 304A is a photodetector at a first backscatter position which is also axially aligned with optical sources 302A, 302C, and optical sensor 304B is a photodetector at a second backscatter position upstream of optical sensor 304A with respect to the flow direction of the airflow 306 in flow path 350. The optical sensor 304A is axially aligned with optical sources 302A, 302C. Thus, optical sensor 304A can be positioned between a pair of optical sources 302A, 302C, each configured to emit a different wavelength of light. Similarly, optical sensor 304B can be positioned between a pair of optical sources 302B, 302D, each configured to emit a different wavelength of light. Optical sensor 304C is an example of a side-scatter position photodetector, and optical sensor 304D is an example of a forward-scatter position photodetector.

As can be seen in the example of FIG. 4, optical sensors 304A, 304B can be angled toward optical sensor 304C. Optical sensor 304D can also be angled toward optical sensor 304C; however, unlike optical sensors 304A, 304B, the optical sensor 304D does not have optical sources proximate or axially aligned. Light observed by optical sensors 304A-D based on the wavelength and positioning of optical sources 302A-D can be used to observe and characterize particulates above a minimum sensing size. For example, through testing and calibration, the sensor data 118 may have different signatures that can be used to distinguish between aerosols, smoke, dust, water, and metallic particles. Since signal strength may vary depending upon the distance of particulate matter from the optical sensors 304A-D, the controller 102 of FIG. 2 can compute ratio values to scale results. Scattering volume ratios can provide information on the type of particulate based on the scattering properties, such as polarization and index of refraction. Pulse width can provide a more direct measurement of foreign object debris size, while amplitude dependence can provide improved discrimination of hard foreign object debris from particulates and may enable identification of foreign object debris type. Using both scattering volume ratios, as well as pulse width and amplitude data, can improve the ability of the controller 102 to not only size the particulates and foreign object debris but may also enable identification of foreign object debris material type.

Figure 5:
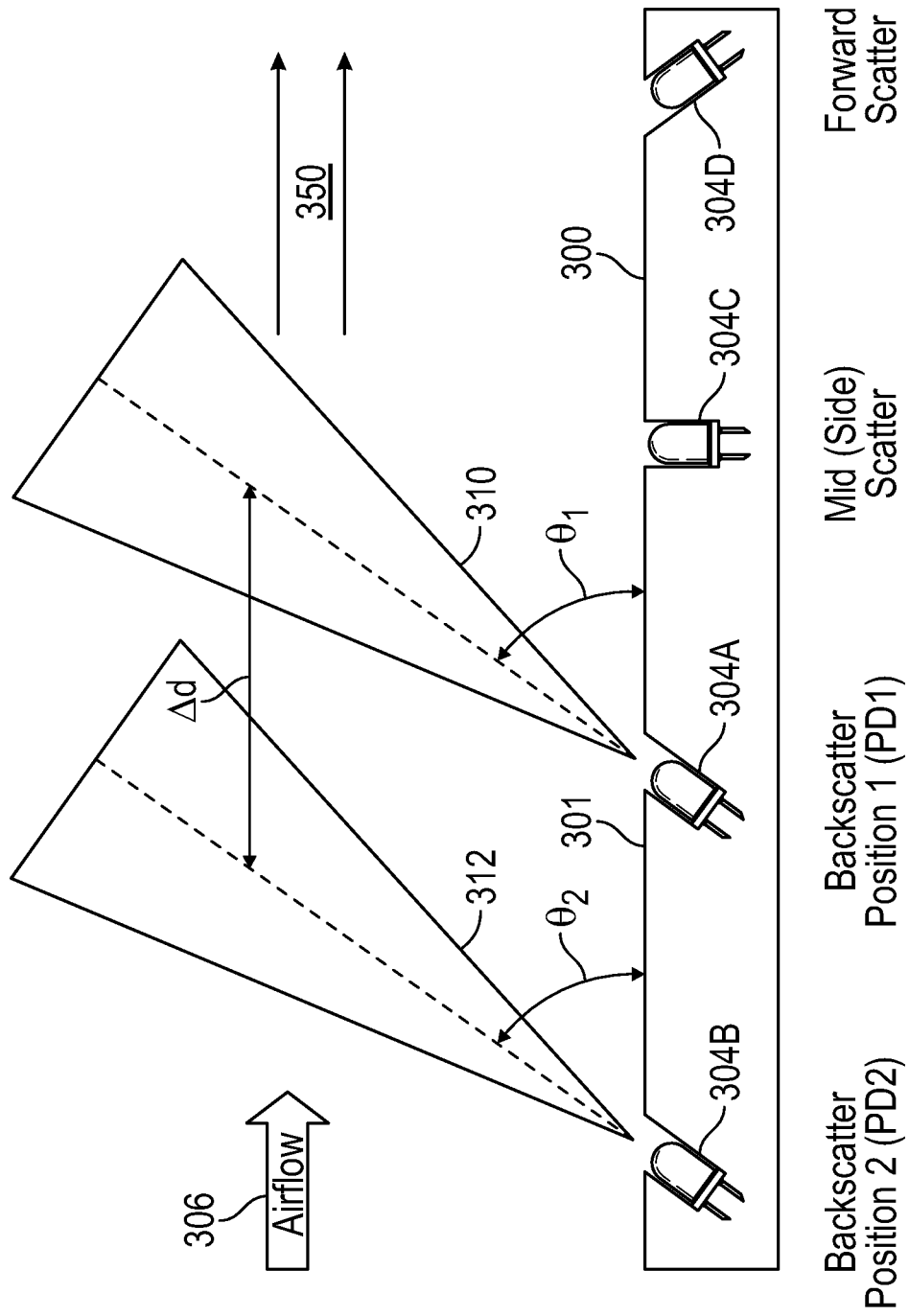
FIG. 5 is a schematic diagram of backscatter detection fields, in accordance with an embodiment of the disclosure.

FIG. 5 is a schematic diagram of backscatter detection fields 310, 312, of optical particulate detector 300 in accordance with an embodiment. Backscatter detection field 310 of optical sensor 304A (at PD1) has an angle of $\theta_1$, and backscatter detection field 312 of optical sensor 304B (at PD2) has an angle of $\theta_2$ with respect to a surface 301 of the optical particulate detector 300, where the center of the backscatter detection fields 310, 312 is separated by a physical distance $\Delta d$. For laminar flow, the two backscatter positions should see the same light signals reproduced but offset by $\Delta t$ (when $\theta_1 = \theta_2$). A cross-correlation algorithm can be used by the controller 102 of FIG. 2 to determine offset time, $\Delta t$, between PD1 and PD2. Velocity can be determined as $v = \Delta d / \Delta t$. The use of multiple backscatter positions can increase the robustness of velocity and detection size. Additional backscatter positions at increased separation distances can provide better resolution (or reduced sample rate) at higher speeds to achieve the same velocity resolution. Mid (or side) scatter and forward scatter can support discrimination of particulates from foreign object debris events. Cone angles can be determined by optical elements and may have half angles of 3 to 20 degrees, for example.

FIG. 6 is a schematic diagram of a side view of an optical particulate detector 400, and FIG. 7 is a schematic diagram of a side view of an optical particulate detector 500. The optical particulate detector 400 and 500 are similar to the optical particulate detector 300 in having a same number of optical sensors 304A-D. In contrast to optical particulate detector 300, the optical particulate detector 400 angles the optical sensor 304B away from optical sensor 304C, similar to optical sensor 304D. The optical particulate detector 500 includes a different order of the optical sensors 304A-D with respect to the direction of airflow 306 in flow path 350. In the example optical particulate detector 300 of FIGS. 3-5, the optical sensors 304A-D are ordered in series from an upstream to a downstream direction as optical sensors 304B, 304A, 304C, 304D. In the example of FIG. 7, the optical particulate detector 500 includes optical sensors 304A-D ordered in series from an upstream to a downstream direction as optical sensors 304A, 304C, 304D, 304B.

Figure 8:
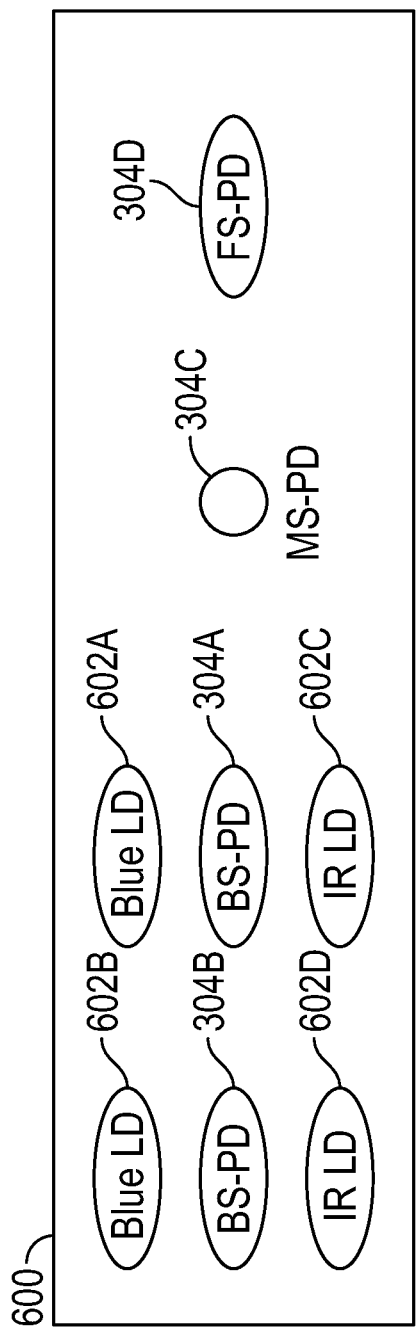
FIG. 8 is a schematic diagram of a top view of an optical particulate detector, in accordance with an embodiment of the disclosure.
Figure 9:
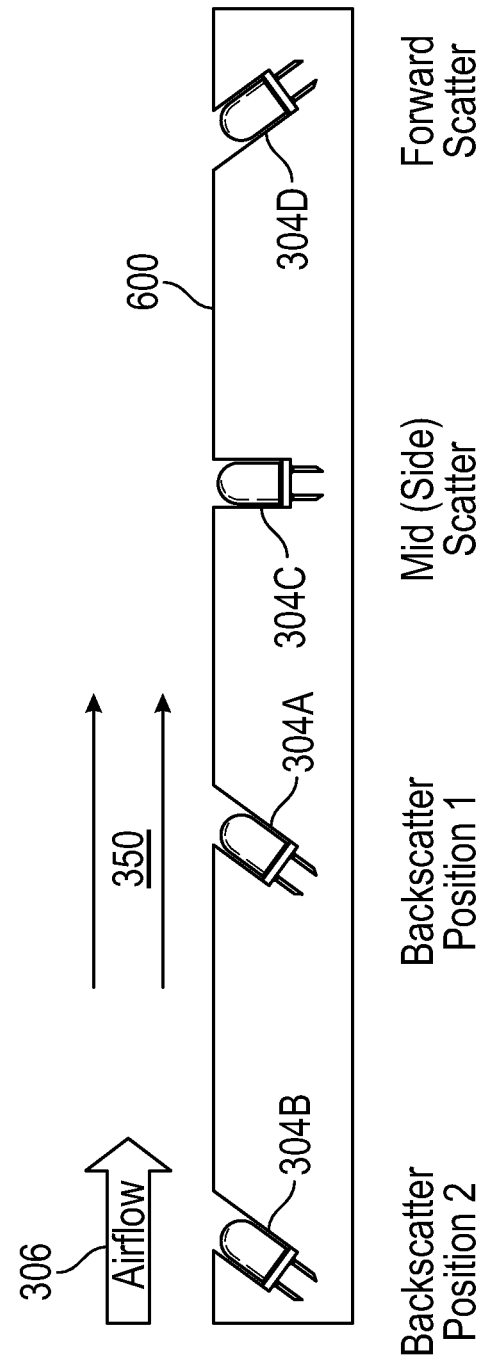
FIG. 9 is a schematic diagram of a side view of an optical particulate detector, in accordance with an embodiment of the disclosure.

Similar to the optical particulate detector 300 of FIGS. 3-5, the optical particulate detector 600 of FIGS. 8 and 9 includes four optical sensors 304A, 304B, 304C, 304D distributed in a series with respect to a flow path 350 of a component surface of an aircraft. However, rather than using light emitting diodes, the optical particulate detector 600 includes two optical sources 602A, 602B as blue laser diodes and two optical sources 602C, 602D as infrared laser diodes. The laser diodes of optical sources 602A-602D may include beam shaping optics, e.g. Powell lenses, to produce "sheets" of light. The optical sensors 304A, 304B, 304C, 304D may also employ various lenses, such as Powell lenses, and/or incorporate wide viewing angles (e.g., up to 180 degrees).

Optical particulate detector 700 of FIGS. 10 and 11 illustrates a hybrid approach that combines light emitting diodes and laser diodes. The optical particulate detector 700 includes optical source 302A as a blue light emitting diode paired with optical source 302C as an infrared light emitting diode positioned proximate to a first backscatter photodetector 304A. The optical particulate detector 700 also includes optical source 602B as a blue laser diode paired with optical source 602D as an infrared laser diode positioned proximate to a second backscatter photodetector 304B. The optical particulate detector 700 can include additional laser diode and photodetector groups, such as optical source 602M as a blue laser diode paired with optical source 602N as an infrared laser diode positioned proximate to an additional backscatter photodetector 304N. The optical particulate detector 700 can also include optical sensor 304C as a side-scatter photodetector and optical sensor 304D as a forward-scatter photodetector. FIG. 12 illustrates how the additional backscatter photodetector 304N (where N indicates any number of sensing volumes, e.g., 3, 4, 5, etc.) can have an additional backscatter detection field 714 at an angle of $\theta_n$ with respect to a surface 701 of the optical particulate detector 700, similar to backscatter detection fields 710, 712 of optical sensors 304A, 304B.

Figure 13:
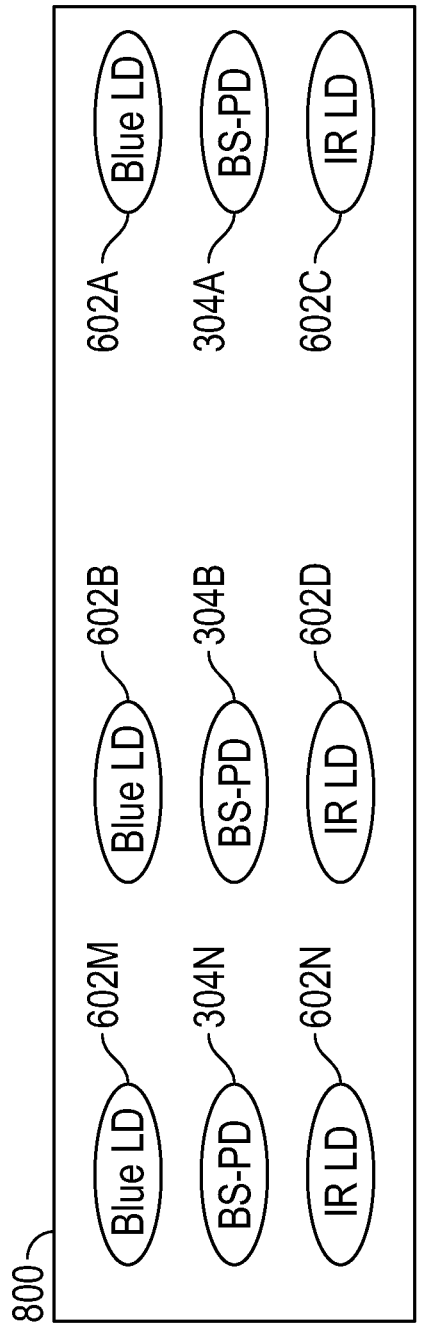
FIG. 13 is a schematic diagram of a top view of an optical particulate detector, in accordance with an embodiment of the disclosure.
Figure 14:
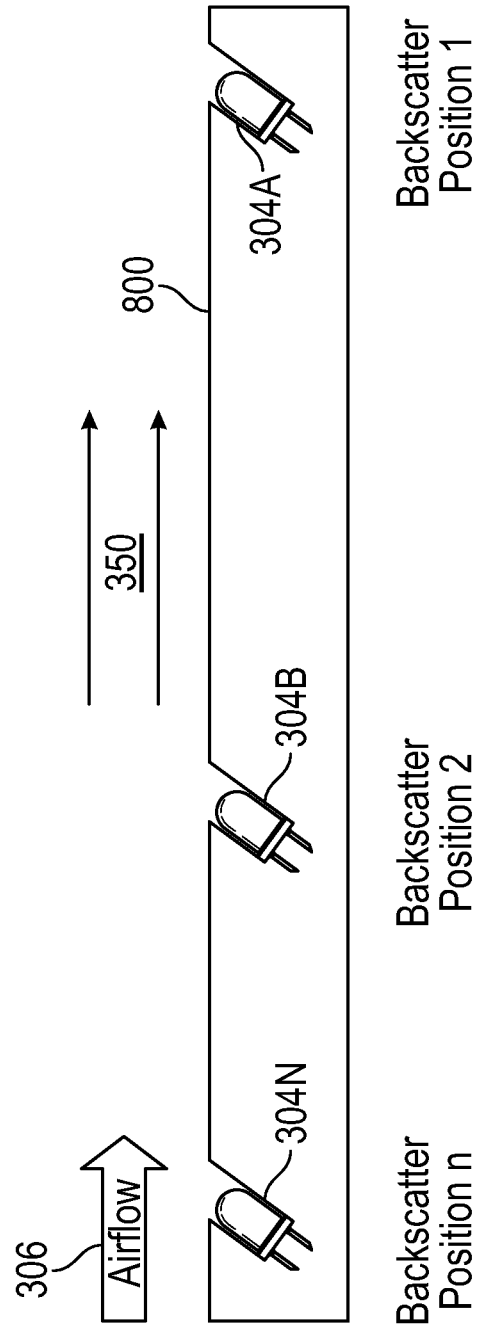
FIG. 14 is a schematic diagram of a side view of an optical particulate detector, in accordance with an embodiment of the disclosure.
Figure 15:
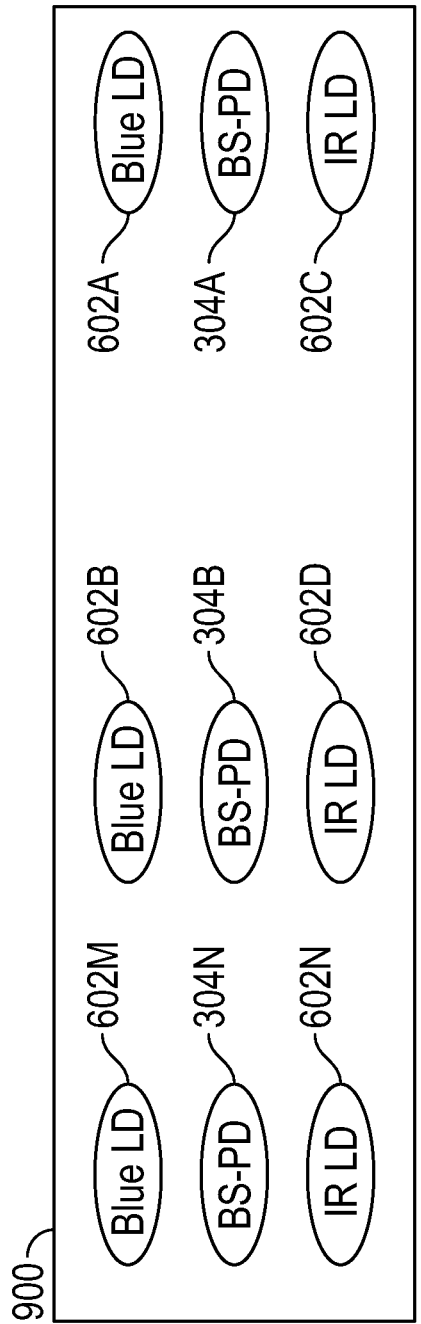
FIG. 15 is a schematic diagram of a top view of an optical particulate detector, in accordance with an embodiment of the disclosure.
Figure 16:
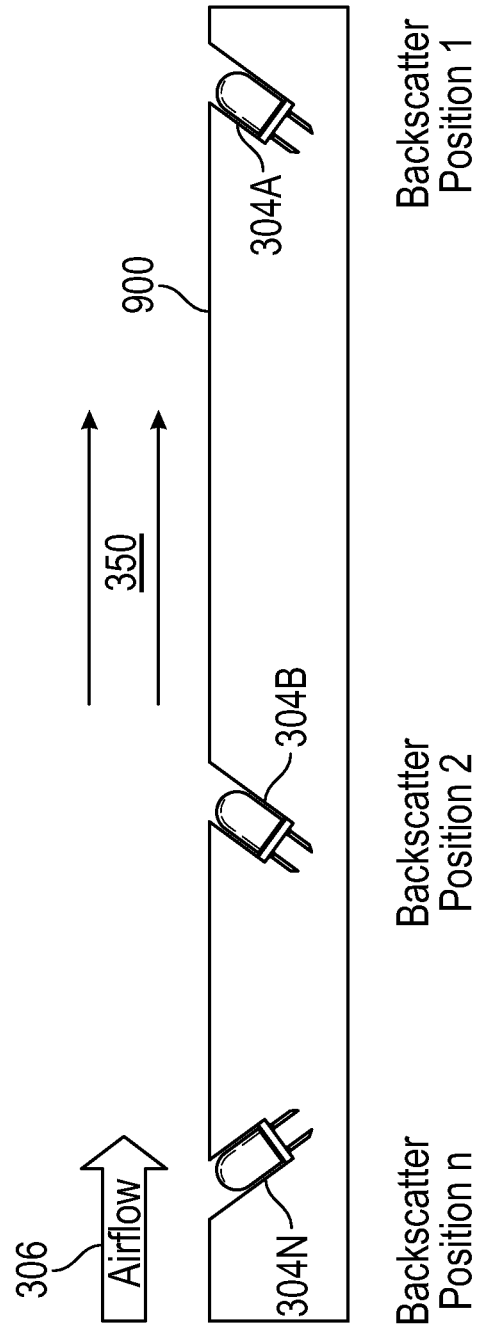
FIG. 16 is a schematic diagram of a side view of an optical particulate detector, in accordance with an embodiment of the disclosure.

FIGS. 13 and 14 illustrate how multiple groups of laser diodes can be used to expand velocity resolution or optical particulate detector 800. In the example of FIGS. 13 and 14, three optical sources 602A, 602B, 602M can be blue laser diodes paired with three optical sources 602C, 602D, 602N as infrared laser diodes grouped respectively with optical sensors 304A, 304B, 304N at backscatter positions 1, 2, and n respectively in an upstream direction of the airflow 306 in flow path 350. FIGS. 15 and 16 depict an optical particulate detector 900 that is similar to the optical particulate detector 800 of FIGS. 13 and 14, with the exception that the optical sensor 304N at backscatter position n is oriented in an upstream direction instead of a downstream direction.

FIGS. 17A-17D illustrate that a reduced set of optical sources and optical sensors can be used for optical particle detection as compared to the previous examples. FIG. 17A is a schematic diagram of a top view of an optical particulate detector 950A in a first reduced optical sensor configuration, and FIG. 17B is a schematic diagram of a top view of an optical particulate detector 950B in a second reduced optical sensor configuration. In the examples of FIGS. 17A and 17B, the optical particulate detector 950A, 950B each include a single optical sensor 304A, such as a backscatter position photodetector between a pair of optical sources. The optical sources may both be of the same wavelength, such as infrared diodes as optical sources 602C, 602D aligned on either side of the optical sensor 304A in a series with respect to a flow direction in optical particulate detector 950A. Alternatively, the optical sources can be of different wavelengths, such as a blue laser diode as optical source 602B and an infrared laser diode as optical source 602C in optical particulate detector 950B. In the example of optical particulate detector 950C, a pair of optical sensors 304A, 304B is arranged in series with respect to a flow direction, where optical source 602C is adjacent to optical sensor 304A, and optical source 602D is adjacent to optical sensor 304B. In the example of optical particulate detector 950D, a pair of optical sensors 304A, 304B is arranged in series with respect to a flow direction, where optical source 602C is adjacent to optical sensor 304A, and optical source 602B is adjacent to optical sensor 304B. Other variations of arrangements and quantities of optical sources and optical sensors are contemplated.

Figure 18:
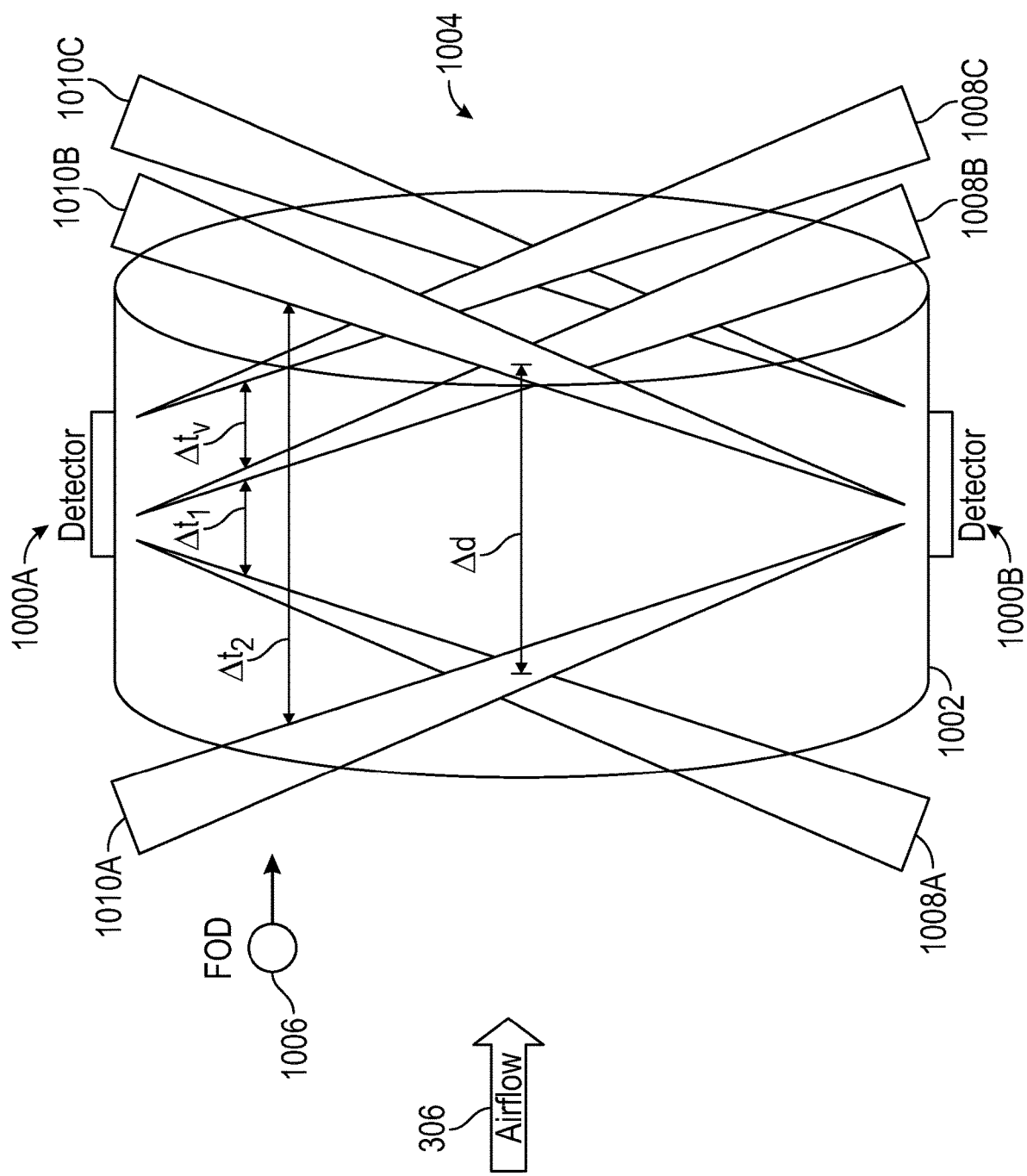
FIG. 18 is a schematic diagram of a multiple detector configuration, in accordance with an embodiment of the disclosure.

FIG. 18 is a schematic diagram of a multiple detector configuration, in accordance with an embodiment. A first optical particulate detector 1000A and a second optical particulate detector 1000B are located within an aircraft component 1002 that received airflow 306, which may include foreign object debris 1006 in particulate matter in a flow path 1004. Backscatter detection fields 1008A, 1008B, 1008C of the first optical particulate detector 1000A can be used in conjunction with backscatter detection fields 1010A, 1010B, 1010C of the second optical particulate detector 1000B to more precisely locate a position of the foreign object debris 1006 in particulate matter in a flow path 1004. For instance, by monitoring both the first optical particulate detector 1000A and the second optical particulate detector 1000B, the controller 102 of FIG. 2 can determine whether the foreign object debris 1006 is closer to the first optical particulate detector 1000A or the second optical particulate detector 1000B and may confirm sizing and velocity of the foreign object debris 1006, for instance, using a triangulation approach. Timing values of $\Delta t_v$, $\Delta t_1$, and $\Delta t_2$ can be used for velocity calculations. Values of $\Delta t_1$ and $\Delta t_2$ can be used to approximate velocity by averaging the calculated velocities using a $\Delta d$ through the axis of the inlet where the sensing regions intersect, where $\Delta t$ values are times to traverse sensing regions and $\Delta d$ is a distance between sensing regions. A proportion between $\Delta t_1$ and $\Delta t_2$ can be used to determine a perpendicular position of the foreign object debris 1006 from the first optical particulate detector 1000A. Additional instances of the first optical particulate detector 1000A and the second optical particulate detector 1000B can be added to enhance detection capabilities.

Figure 19:
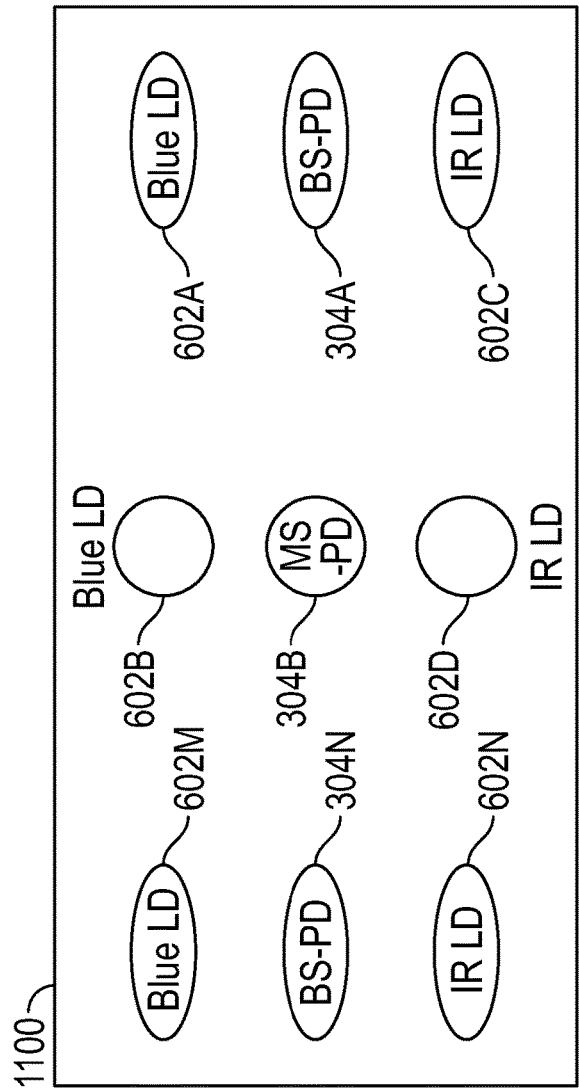
FIG. 19 is a schematic diagram of a top view of an optical particulate detector, in accordance with an embodiment of the disclosure.
Figure 20:
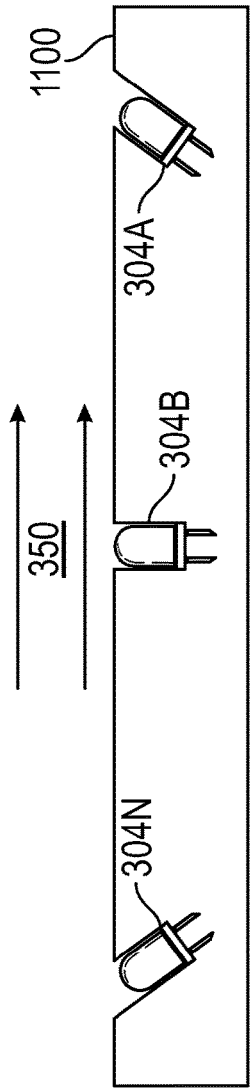
FIG. 20 is a schematic diagram of a side view of an optical particulate detector, in accordance with an embodiment of the disclosure.

FIGS. 19 and 20 illustrate how multiple groups of laser diodes can be compactly arranged for optical particulate detector 1100. In the example of FIGS. 19 and 20, three optical sources 602A, 602B, 602M can be blue laser diodes paired with three optical sources 602C, 602D, 602N as infrared laser diodes grouped respectively with optical sensors 304A, 304B, 304N at backscatter positions 1, 2, and n respectively in an upstream direction of the airflow 306 in flow path 350. In the example of FIGS. 19 and 20, the optical sensors 304A, 304B, 304N are oriented to expand coverage by angling optical sensors 304A and 304N outwardly in opposite directions, while optical sensor 304B can be substantial normal to the direction of airflow 306.

Figure 21:
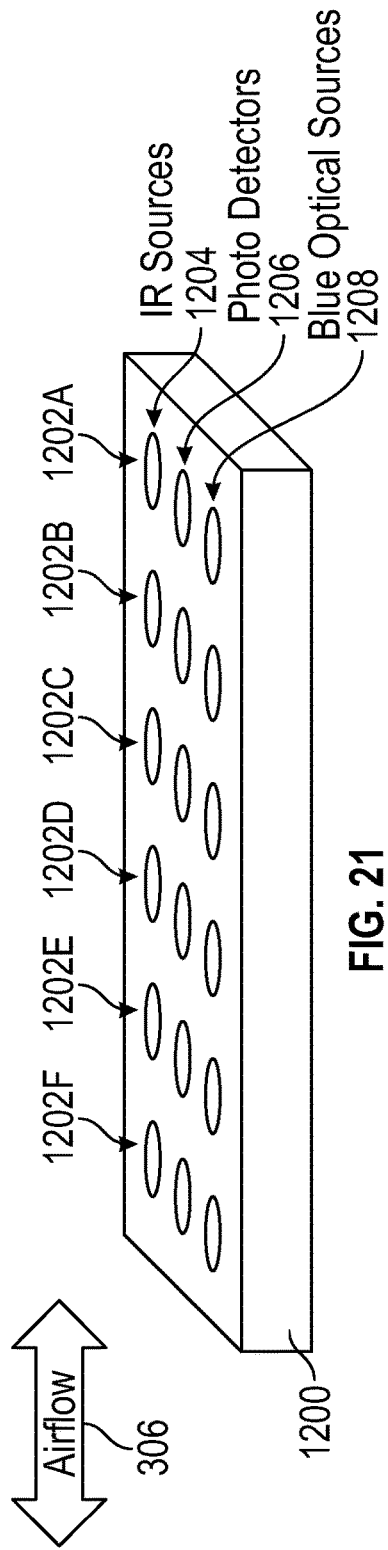
FIG. 21 is a schematic diagram of a side view of an optical particulate detector, in accordance with an embodiment of the disclosure.
Figure 22:
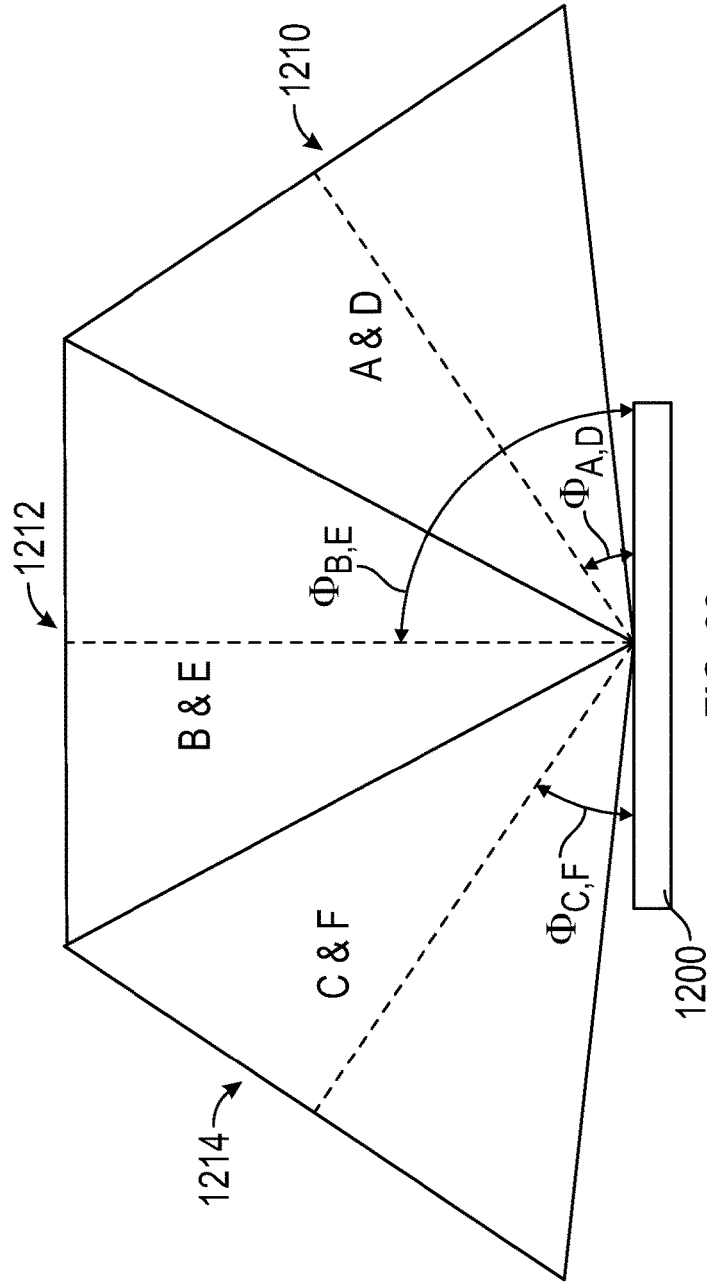
FIG. 22 is a schematic diagram of a front view of an optical particulate detector, in accordance with an embodiment of the disclosure.

FIGS. 21 and 22 depict schematic diagrams of a side view and front view respectively of an optical particulate detector 1200 with multiple overlapping sensing volumes. Sensing volumes are staggered at various angles to cover an inlet area and volume. In the example of FIG. 21, there are six sensor groups 1202A, 1202B, 1202C, 1202D, 1202E, and 1202F, where each of the sensor groups 1202A-1202F include at least one infrared optical source 1204, photodetector 1206, and blue optical source 1208. The infrared optical sources 1204 and blue optical sources 1208 can be light emitting diodes, laser diodes, or other types of optical sources. For example, the six sensor groups 1202A-1202F can be oriented with different axial angles, such as using two sets of three off-axis angles $\Phi$ to form partially overlapping sensing volumes. For instance, sensor groups 1202A and 1202D can have a first sensing angle $\Phi_{A,D}$ that establishes a first sensing volume 1210, sensor groups 1202B and 1202E can have a second sensing angle $\Phi_{B,E}$ that establishes a second sensing volume 1212, and sensor groups 1202C and 1202F can have a third sensing angle $\Phi_{C,F}$ that establishes a third sensing volume 1214, where sensing volumes 1210, 1212, 1214 do not substantially overlap (e.g., about 45 degrees, 90 degrees, 135 degrees). Other variations of angles and number of sensor groups can be made depending upon coverage needed, such as an area and volume of an inlet.

Figure 23:
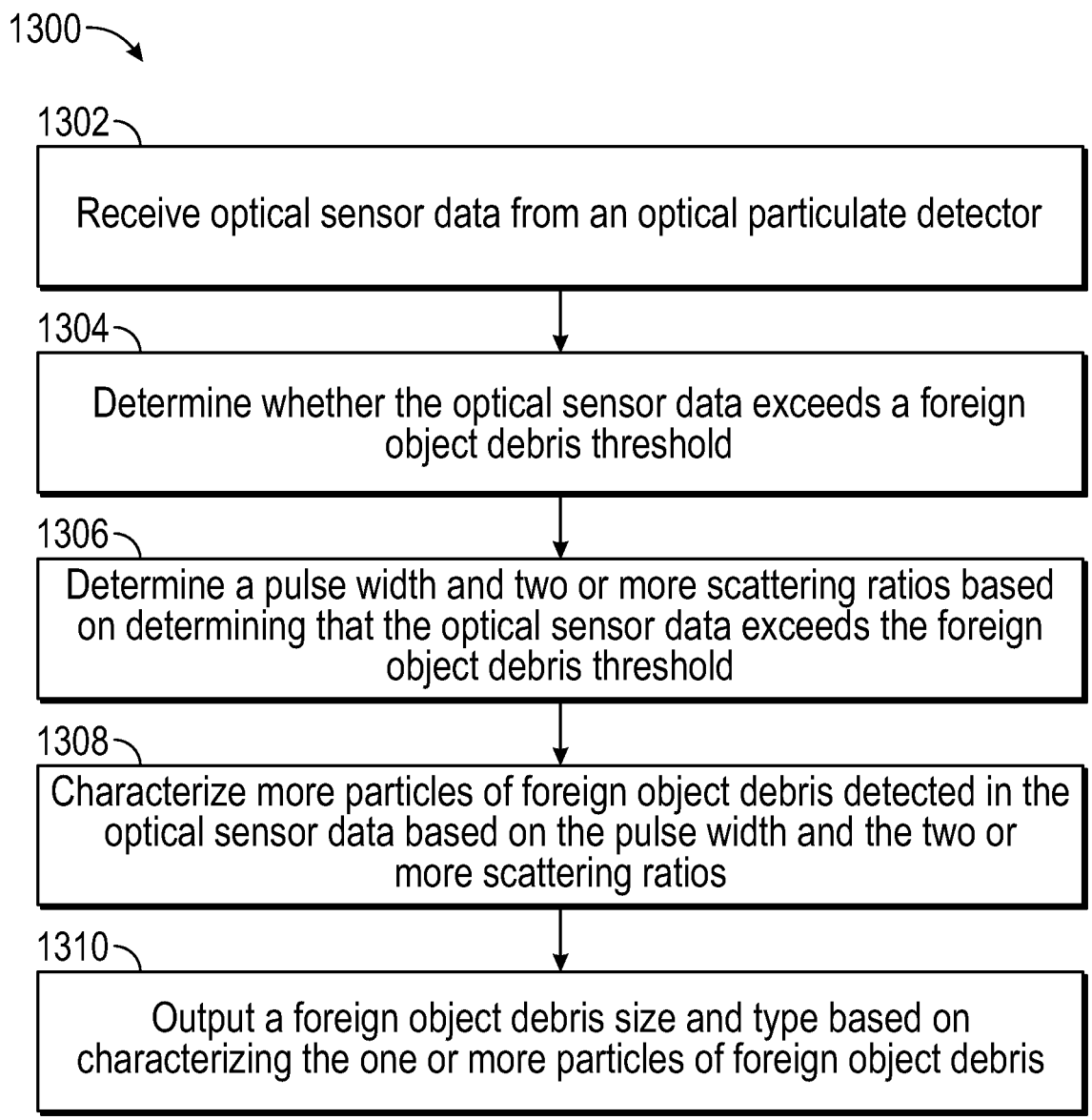
FIG. 23 is a flow chart illustrating a method, in accordance with an embodiment of the disclosure.

Referring now to FIG. 23 with continued reference to FIGS. 1-23, FIG. 23 is a flow chart illustrating a method 1300 for optical particulate detection for an aircraft, in accordance with an embodiment. The method 1300 may be performed, for example, by controller 102 of FIG. 2 in various system configurations.

At block 1302, the controller 102 receives a plurality of optical sensor data 118 from the optical particulate detector 200. Various embodiments of the optical particulate detector 200 can be used, such as optical particulate detector 300, 400, 500, 600, 700, 800, 900, 950A, 950B, 950C, 950D, 1000A, 1000B, 1100, 1200.

At block 1304, the controller 102 can determine whether the optical sensor data 118 exceeds a foreign object debris threshold. The foreign object debris threshold can be a minimum amplitude value. This can filter out low-level noise from being processed as foreign object debris.

At block 1306, the controller 102 can determine a pulse width and two or more scattering ratios based on determining that the optical sensor data 118 exceeds the foreign object debris threshold. The pulse width can provide relative timing, and the scattering ratios can consider polarization and index of refraction for volume computations. The scattering ratios can scale the optical sensor data 118 relative to values from one or more of the optical sensors 204.

At block 1308, the controller 102 can characterize the one or more particles of foreign object debris detected in the optical sensor data 118. Characterization can be performed using a lookup table that defines sizing and material profiles based on two or more parameters, for example. For instance, blue light scatter and infrared light scatter can define relative particle signatures.

At block 1310, the controller 102 can output a foreign object debris size and type based on characterizing the one or more particles of foreign object debris. The foreign object debris data can be tracked and used to determine maintenance events, inspection events, component life predictions, as well as control adjustments.

In some embodiments, a subset of the method 1300 can be performed as monitoring an optical particulate detector 200 including at least two optical sources 202 and at least one optical sensor 204 distributed in series with respect to the flow path of a component surface of an aircraft. One or more particles of foreign object debris can be characterized based on a pulse width and two or more scattering ratios determined with respect to light emitted from the at least two optical sources 202.

In one or more embodiments, one or more velocity measurements can be determined by the controller 102 based on the sensor data 118 from the at least one optical sensor 204. A foreign object debris velocity can be determined based on the one or more velocity measurements. Velocity data can be averaged.

The at least two optical sources 202 can include at least one blue light source and at least one infrared light source. The at least one optical sensor 204 can include at least one backscatter position photodetector, at least one side-scatter position photodetector, and at least one forward-scatter position photodetector. The at least one optical sensor 204 can include a plurality of sensor groups having at least two different axial angles with a plurality of sensing volumes across an area. The at least one backscatter position photodetector can include a first backscatter position photodetector in series with a second backscatter position photodetector with respect to the flow path. The at least two optical sources can include a first pair of optical sources axially aligned with the first backscatter position photodetector and a second pair of optical sources axially aligned with the second backscatter position photodetector. A first sensing angle of the first backscatter position photodetector can be axially offset relative to a second sensing angle of the second backscatter position photodetector to form at least two partially overlapping sensing volumes. The at least two optical sources can include one or more of a light emitting diode and/or a laser diode. A first instance of the optical particulate detector can be positioned at a first location in the flow path, and a second instance of the optical particulate detector can be positioned at a second location in the flow path. The at least one optical sensor can include a first backscatter position photodetector in series with a second backscatter position photodetector and a third backscatter position photodetector with respect to the flow path. Additional sensors can improve time-base correlation as particle movement is tracked. Optical elements may use beam shaping to transform a cone of light into a sheet of light to reduce blind spot detection volume and provide a greater range with increased power density. Combining cones of light from light emitting diodes with sheets of light from laser diodes can provide a tradeoff between sampling rate and detectability.

While the above description has described the flow process of FIG. 23 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. The photodetectors, as disclosed herein, can include various types of optical sensors, such as multi-pixel photon counters (MPPCs), photomultiplier tubes (PMTs), avalanche photodiodes (APDs), and/or other types of photodiodes and detectors known in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An optical particulate detection system for an aircraft, the optical particulate detection system comprising:
    an optical particulate detector comprising at least two optical sources and at least one optical sensor distributed in series with respect to a flow path of a component surface of the aircraft; and
    a controller configured to:
        interface with the optical particulate detector;
        monitor the at least one optical sensor;
        receive a plurality of optical sensor data from the optical particulate detector;
        determine whether an amplitude of the optical sensor data exceeds a foreign object debris threshold comprising a minimum amplitude value;
        determine a pulse width of a pulse detected in the optical sensor data and two or more scattering ratios based on determining that the amplitude of the optical sensor data exceeds the foreign object debris threshold, wherein the two or more scattering ratios comprise ratios of light observed by the at least one optical sensor to light emitted from the at least two optical sources;

characterize one or more particles of foreign object debris detected in the optical sensor data, wherein the pulse width provides a measurement of a foreign object debris size and is used for discrimination of hard foreign object debris from particulates, and the two or more scattering ratios are used to identify particulate type relative to particle signatures; and output the foreign object debris size and type based on characterizing the one or more particles of foreign object debris.

2. The optical particulate detection system of claim 1, wherein the controller is configured to:
determine one or more velocity measurements based on the sensor data from the at least one optical sensor; and
determine a foreign object debris velocity based on the one or more velocity measurements.

3. The optical particulate detection system of claim 1, wherein the at least two optical sources comprise at least one blue light source and at least one infrared light source.

4. The optical particulate detection system of claim 1, wherein the at least one optical sensor comprises a plurality of sensor groups having at least two different axial angles with a plurality of sensing volumes across an area.

5. The optical particulate detection system of claim 4, wherein the at least one optical sensor comprises a first backscatter position photodetector in series with a second backscatter position photodetector with respect to the flow path.

6. The optical particulate detection system of claim 5, wherein the at least two optical sources comprise a first pair of optical sources axially aligned with the first backscatter position photodetector and a second pair of optical sources axially aligned with the second backscatter position photodetector.

7. The optical particulate detection system of claim 6, wherein a first sensing angle of the first backscatter position photodetector is axially offset relative to a second sensing angle of the second backscatter position photodetector to form at least two partially overlapping sensing volumes.

8. The optical particulate detection system of claim 1, comprising a first instance of the optical particulate detector positioned at a first location in the flow path and a second instance of the optical particulate detector positioned at a second location in the flow path.

9. The optical particulate detection system of claim 8, wherein the at least one optical sensor comprises a first backscatter position photodetector in series with a second backscatter position photodetector and a third backscatter position photodetector with respect to the flow path.

10. A method comprising:
monitoring an optical particulate detector comprising at least two optical sources and at least one optical sensor distributed in series with respect to a flow path of a component surface of the aircraft;
receiving a plurality of optical sensor data from the optical particulate detector;
determining whether an amplitude of the optical sensor data exceeds a foreign object debris threshold comprising a minimum amplitude value;
determining a pulse width of a pulse detected in the optical sensor data and two or more scattering ratios based on determining that the amplitude of the optical sensor data exceeds the foreign object debris threshold, wherein the two or more scattering ratios comprise ratios of light observed by the at least one optical sensor to light emitted from the at least two optical sources;
characterizing one or more particles of foreign object debris detected in the optical sensor data, wherein the pulse width provides a measurement of a foreign object debris size and is used for discrimination of hard foreign object debris from particulates, and the two or more scattering ratios are used to identify particulate type relative to particle signatures; and
outputting the foreign object debris size and type based on characterizing the one or more particles of foreign object debris.

11. The method of claim 10, further comprising:
determining one or more velocity measurements based on the sensor data from the at least one optical sensor; and
determining a foreign object debris velocity based on the one or more velocity measurements.

12. The method of claim 10, wherein the at least two optical sources comprise at least one blue light source and at least one infrared light source.

13. The method of claim 10, wherein the at least one optical sensor comprises a plurality of sensor groups having at least two different axial angles with a plurality of sensing volumes across an area.

14. The method of claim 13, wherein the at least one optical sensor comprises a first backscatter position photodetector in series with a second backscatter position photodetector with respect to the flow path.

15. The method of claim 14, wherein the at least two optical sources comprise a first pair of optical sources axially aligned with the first backscatter position photodetector and a second pair of optical sources axially aligned with the second backscatter position photodetector.

16. The method of claim 15, wherein a first sensing angle of the first backscatter position photodetector is axially offset relative to a second sensing angle of the second backscatter position photodetector to form at least two partially overlapping sensing volumes.

17. The method of claim 10, wherein a first instance of the optical particulate detector is positioned at a first location in the flow path, and a second instance of the optical particulate detector is positioned at a second location in the flow path.

18. The method of claim 17, wherein the at least one optical sensor comprises a first backscatter position photodetector in series with a second backscatter position photodetector and a third backscatter position photodetector with respect to the flow path.

* * * * *